(12) United States Patent
Keohane et al.

(10) Patent No.: US 10,436,609 B2
(45) Date of Patent: Oct. 8, 2019

(54) POSITION SENSOR ASSEMBLY

(71) Applicant: Moog Inc., East Aurora, NY (US)

(72) Inventors: Eugene F. Keohane, Springfield, PA (US); Joseph Diaz, Nottingham, PA (US)

(73) Assignee: Moog Inc., East Aurora, NY (US)

(*) Notice: Subject to any disclaimer, the term of this patent is extended or adjusted under 35 U.S.C. 154(b) by 0 days.

(21) Appl. No.: 15/521,611

(22) PCT Filed: Oct. 23, 2015

(86) PCT No.: PCT/US2015/057141
§ 371 (c)(1),
(2) Date: Apr. 24, 2017

(87) PCT Pub. No.: WO2016/065275
PCT Pub. Date: Apr. 28, 2016

(65) Prior Publication Data
US 2017/0241810 A1    Aug. 24, 2017

Related U.S. Application Data

(60) Provisional application No. 62/068,516, filed on Oct. 24, 2014.

(51) Int. Cl.
*G01D 5/22* (2006.01)
*H02K 24/00* (2006.01)
*G01D 5/20* (2006.01)

(52) U.S. Cl.
CPC .......... *G01D 5/2291* (2013.01); *G01D 5/204* (2013.01); *G01D 5/22* (2013.01); *H02K 24/00* (2013.01)

(58) Field of Classification Search
CPC ........ G01D 5/2291; G01D 5/204; G01D 5/22; H02K 24/00
See application file for complete search history.

(56) References Cited

U.S. PATENT DOCUMENTS 5,216,364 A   6/1993  Ko et al.
5,777,468 A   7/1998  Maher
(Continued)

FOREIGN PATENT DOCUMENTS

CN   101563585 A   10/2009
CN   102808982 A   12/2012
(Continued)

OTHER PUBLICATIONS

International Preliminary Report on Patentability and PCT Written Opinion of the International Searching Authority (European Patent Office) (9 pages) dated Apr. 25, 2017.
(Continued)

*Primary Examiner* — Christopher P McAndrew
*Assistant Examiner* — Zannatul Ferdous
(74) *Attorney, Agent, or Firm* — Harter Secrest & Emery LLP

(57) ABSTRACT

A position sensor assembly comprising (15) a housing (16) having a least one inner cavity, a stator (22) disposed within the housing, a moving element (23) disposed within the housing and configured and arranged to move relative to the stator (22), the stator comprising primary windings (24) and secondary windings (25, 26), the secondary windings configured and arranged to provide an output signal (27) as a function of movement of the moving element (23) relative to the stator (22), electronics (28) disposed in the housing and communicating with the primary windings (24) and the secondary windings (25, 26), the electronics comprising an integrated circuit (29) configured and arranged to provide excitation of the primary windings (24) and to demodulate the output signal (27) of the secondary windings (25, 26), and an input element (35) extending through the housing (16) and connected to the moving element (23).

18 Claims, 10 Drawing Sheets

(56) References Cited

U.S. PATENT DOCUMENTS

| | | | |
|---|---|---|---|
| 5,811,967 A | 9/1998 | Shank et al. | |
| 7,023,201 B2 | 4/2006 | Sogge et al. | |
| 8,476,896 B2 | 7/2013 | Mednikov | |
| 8,615,040 B2 | 12/2013 | Narimatsu et al. | |
| 8,928,310 B2* | 1/2015 | Ocket | G01D 5/2046 |
| | | | 235/449 |
| 2005/0029975 A1* | 2/2005 | Carson | G01K 7/42 |
| | | | 318/432 |
| 2007/0200560 A1 | 8/2007 | Saito et al. | |
| 2008/0012522 A1* | 1/2008 | Wiegers | H02P 6/16 |
| | | | 318/638 |
| 2010/0090688 A1 | 4/2010 | Mednikov | |
| 2010/0134997 A1 | 6/2010 | Heim | |
| 2011/0285387 A1* | 11/2011 | Andrae | G01D 5/147 |
| | | | 324/207.25 |
| 2012/0010849 A1* | 1/2012 | Yamada | G01D 5/2073 |
| | | | 702/151 |
| 2012/0139533 A1* | 6/2012 | Manabe | G01D 5/2073 |
| | | | 324/207.25 |
| 2012/0304964 A1 | 12/2012 | Nemoto et al. | |
| 2013/0251502 A1* | 9/2013 | Ketcham | F04D 15/00 |
| | | | 415/1 |

FOREIGN PATENT DOCUMENTS

| | | |
|---|---|---|
| EP | 0768515 B1 | 1/1999 |
| EP | 2 530 284 A2 | 12/2012 |
| JP | H06294604 A | 10/1994 |
| JP | 3170948 U | 10/2001 |
| JP | 2005181313 A | 7/2005 |
| JP | 2006030217 A | 2/2006 |
| JP | 2008170178 A | 7/2008 |
| JP | 2012168041 A | 9/2012 |
| JP | 2013231651 A | 11/2013 |
| WO | 2010016290 A | 2/2010 |

OTHER PUBLICATIONS

International Search Report and Written Opinion of the International Searching Authority (European Patent Office) (13 pages) dated Jan. 14, 2016.

* cited by examiner

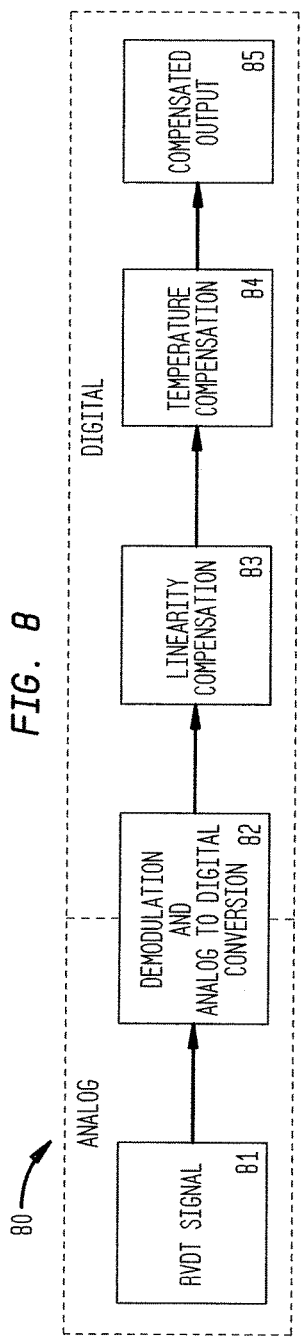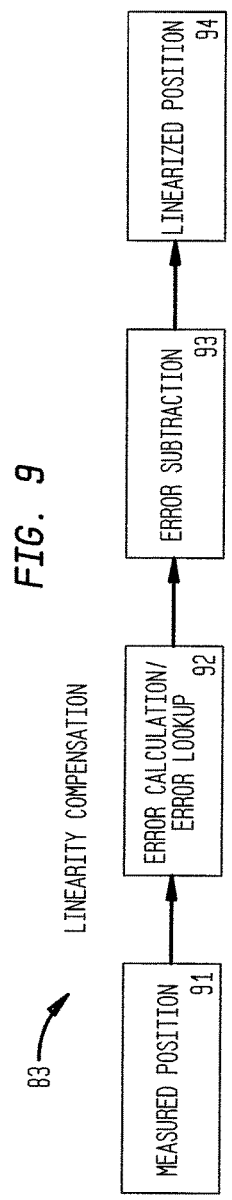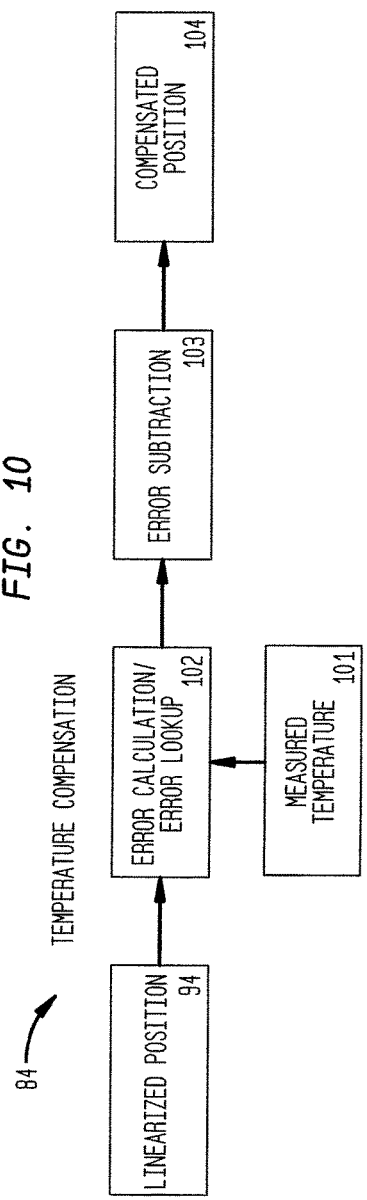

LINEARITY COMPENSATION

TEMPERATURE COMPENSATION

POSITION SENSOR ASSEMBLY

CROSS REFERENCE TO RELATED APPLICATIONS

This application claims priority from U.S. Provisional Patent Application No. 62/068,516 filed on Oct. 24, 2014, which is hereby incorporated by reference in its entirety.

TECHNICAL FIELD

The present invention relates generally to the field of position sensors, and more particularly to a fully integrated position sensor assembly.

BACKGROUND ART

Position sensors are used in many applications, including aircraft, military, transportation, energy, automation and industrial. Such sensors may include encoders, hall position sensors, potentiometers, resolvers and rotary variable differential transformers (RVDTs). RVDTs and resolvers are used in critical applications where more reliable solutions are required. For example, in the aircraft market, the use of fly-by-wire and fly-by-light architectures means that more position sensors are required on each airframe. RVDTs are well known in the market. An electromechanical transducer is used to provide a variable alternating current output voltage that is generally linearly proportional to the angular displacement of an input shaft.

DISCLOSURE OF THE INVENTION

With parenthetic reference to the corresponding parts, portions, or surfaces of the disclosed embodiment, merely for purposes of illustration and not by way of limitation, provided is a position sensor assembly (15) comprising a housing (16) having a least one inner cavity (20, 21), a stator (22) disposed within the housing, a moving element (23) disposed within the housing and configured and arranged to move relative to the stator, the stator comprising primary windings (24) and secondary windings (25, 26), the secondary windings configured and arranged to provide an output signal (27) as a function of movement of the moving element relative to the stator, signal conditioning electronics (28) disposed in the housing and communicating with the primary windings and the secondary windings, the signal conditioning electronics comprising an integrated circuit (29) configured and arranged to provide excitation of the primary windings and to demodulate the output signal of the secondary windings, and an input element (35) extending through the housing and connected to the moving element.

The housing may comprise a sensor housing subassembly (18) having a first inner cavity (20) and an electronics housing subassembly (19) having a second inner cavity (21), and the stator and the moving element may be disposed within the first inner cavity of the sensor housing subassembly, and the signal conditioning electronics may be disposed within the second inner cavity of the electronics housing subassembly. The electronics housing subassembly may be removably connected to the sensor housing subassembly. The sensor housing subassembly may comprise a bearing end portion (36), a sensor body portion (38) and an intermediate portion (39), and the electronics housing subassembly may comprise an electronics body portion (40) and a second end portion (41). The sensor housing subassembly may comprise a signal output port. The moving element may be configured and arranged to move linearly along a central axis relative to the stator or to rotate about a central axis relative to the stator. The moving element may comprise a magnet. The stator and moving element may be selected from a group consisting of a rotary variable differential transformer and a resolver. The signal conditioning electronics may comprise a converter configured and arranged to convert the output signal to a digital signal. The signal conditioning electronics may comprise a signal filter configured and arranged to filter out a carrier frequency. The signal conditioning electronics may comprise a DC signal buffer. The assembly may comprise a temperature sensor (55) configured and arranged to provide a temperature signal (101) to the integrated circuit and the integrated circuit is configured and arranged to provide mover position output (104) compensated (84) as a function of the temperature signal. The assembly may comprise a mover positional calibration data (127) and the integrated circuit is configured and arranged to provide a mover position output (94) compensated (83) as a function of the calibration data. The assembly may comprise a temperature sensor (55) configured and arranged to provide a temperature signal (101) to the integrated circuit and a mover positional calibration data (117, 127), and the integrated circuit is configured and arranged to provide a mover position output (85) compensated as a function of the calibration data and the temperature signal.

In another aspect, a method of calibrating a position sensor assembly (15) is provided comprising the steps of providing a position sensor assembly having a housing with at least one inner cavity, a stator disposed within the housing, a moving element disposed within the housing and configured and arranged to move relative to the stator, an input element extending through the housing and connected to the moving element, the stator comprising primary windings and secondary windings, the secondary windings configured and arranged to provide an output signal as a function of movement of the moving element relative to the stator. The calibration method further comprises providing signal conditioning electronics in the housing having a memory and an integrated circuit communicating with the primary windings and the secondary windings and configured and arranged to provide excitation of the primary winding and to condition the output signal of the secondary windings, providing a temperature sensor in said housing, mounting the position sensor assembly on an external actuator (111, 121), wherein the external actuator is configured and arranged to drive the moving element of the position sensor assembly through a range of reference positions, operating the external actuator through the range of reference positions, calculating a position error (115) as a function of the output signal of the secondary windings (113) and the reference position (112), sensing a measured temperature (124) with the temperature sensor of the position sensor assembly, calculating a temperature error (125) as a function of the output signal of the secondary windings (123), the measured temperature (124), and a temperature reference (122), and storing the position error (116) and the temperature error (126) in the memory (59). The method may further comprise the step of providing a mover position output (85) compensated as a function of the position error (117) and the temperature error (127).

In another aspect, a method of compensating a position sensor assembly is provided comprising the steps of providing a position sensor assembly having a housing with at least one inner cavity, a stator disposed within said housing, a moving element disposed within the housing and configured and arranged to move relative to the stator, an input element extending through the housing and connected to the moving element, the stator comprising primary windings and secondary windings, the secondary windings configured and arranged to provide an output signal as a function of movement of the moving element relative to the stator; providing signal conditioning electronics in the housing having a memory and an integrated circuit communicating with the primary windings and said secondary windings and configured and arranged to provide excitation of the primary winding and to condition the output signal of the secondary windings, providing a positional calibration dataset (117), providing a temperature calibration dataset (127), providing a temperature sensor in the housing; connecting the moving element to an external actuator; operating the external actuator; taking temperature measurements with the temperature sensor, and providing a mover position output (85) compensated as a function of the output signal of the secondary windings (81), the temperature measurements (101), the positional calibration dataset and the temperature calibration dataset.

BRIEF DESCRIPTION OF THE DRAWINGS

FIG. 8 is a block diagram of an embodiment signal conditioning of the position sensor assembly shown in FIG. 1.

FIG. 9 is a block diagram of an embodiment of the linearity compensation shown in FIG. 8.

FIG. 10 is a block diagram the temperature compensation shown in FIG. 8.

DESCRIPTION OF THE PREFERRED EMBODIMENTS

Figure 1:
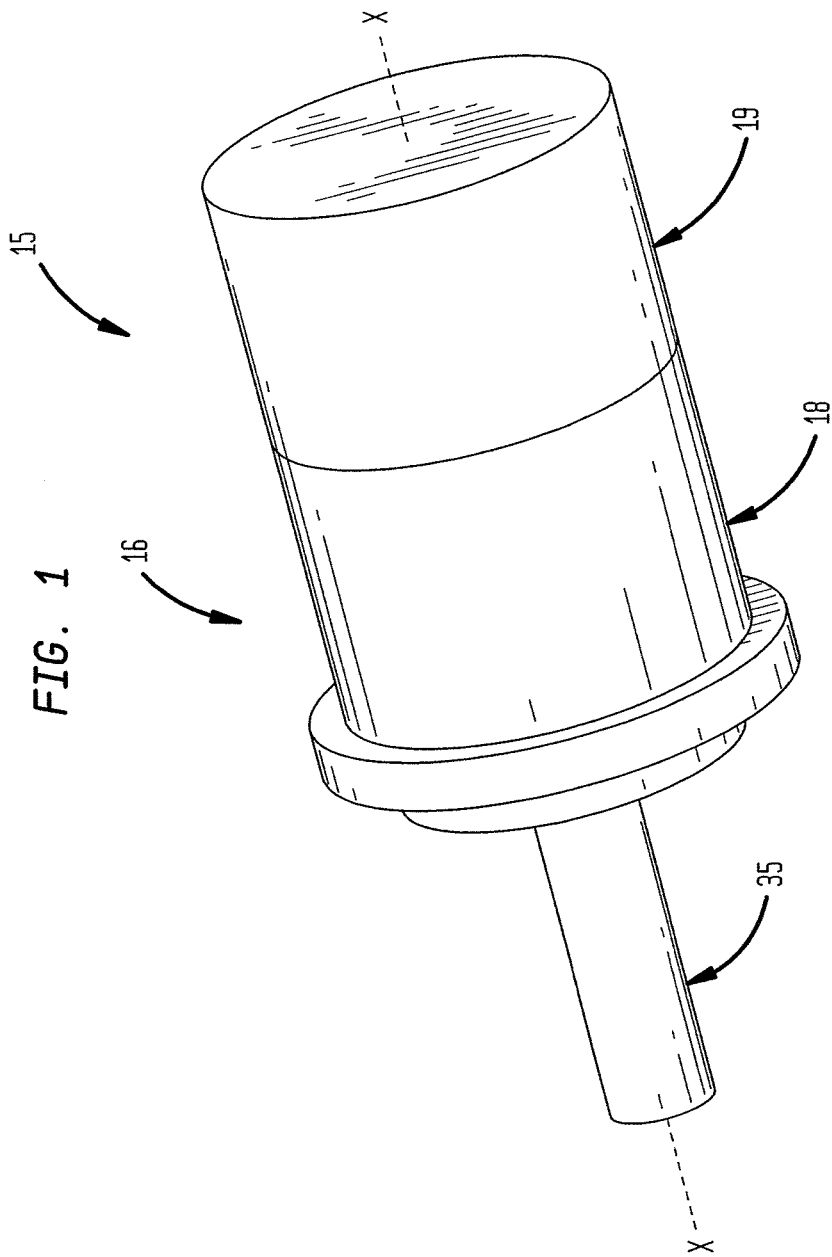
FIG. 1 is a perspective view of a first embodiment of an improved position sensor assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIGS. 1-4, a position sensor assembly is provided, a first embodiment of which is generally indicated at 15. As shown, assembly 15 generally includes RVDT 17, integrated conversion and signal conditioning electronics 28 and housing 16.

RVDT 17 is an electromechanical transducer that provides a variable alternating current output voltage that is linearly proportional to the angular displacement of input shaft 35. When energized by electronics 28 with a fixed AC source 32, output signal 27 is linear within a specific range over the angular displacement. RVDT 17 generally comprises iron core rotor 23 rotationally supported within cavity 20 of subassembly housing 18. Stator 22 includes primary longitudinally extending linked excitation coils 24 and a pair of secondary longitudinally extending linked output coils 25 and 26. A fixed alternating current excitation 32 is applied to primary stator coils 24, which are electromagnetically coupled to secondary coils 25 and 26. This coupling is proportional to the angular displacement of rotor 23 and input shaft 35 about axis x-x. Output pairs 25 and 26 are structured so that one coil set 25 is in phase with excitation coils 24, and the second set 26 is 180 degrees out of phase with excitation coils 24. When rotor 23 is in a position that directs the available flux equally in both the in phase and out of phase coils, the output voltage is cancelled and results in a zero value signal. This is referred to as the electrical zero position or E.Z. When rotor shaft 23 is displaced from E.Z., the resulting output signal 27 has a magnitude in phase relationship proportional to the direction of rotation. Because RVDT 17 performs essentially like a transformer, excitation voltage changes will cause direction proportional changes to the output (transformation ratio). In this embodiment, a MOOG-MCG-MURPHY AS-827 RVDT may be used.

Figure 3:
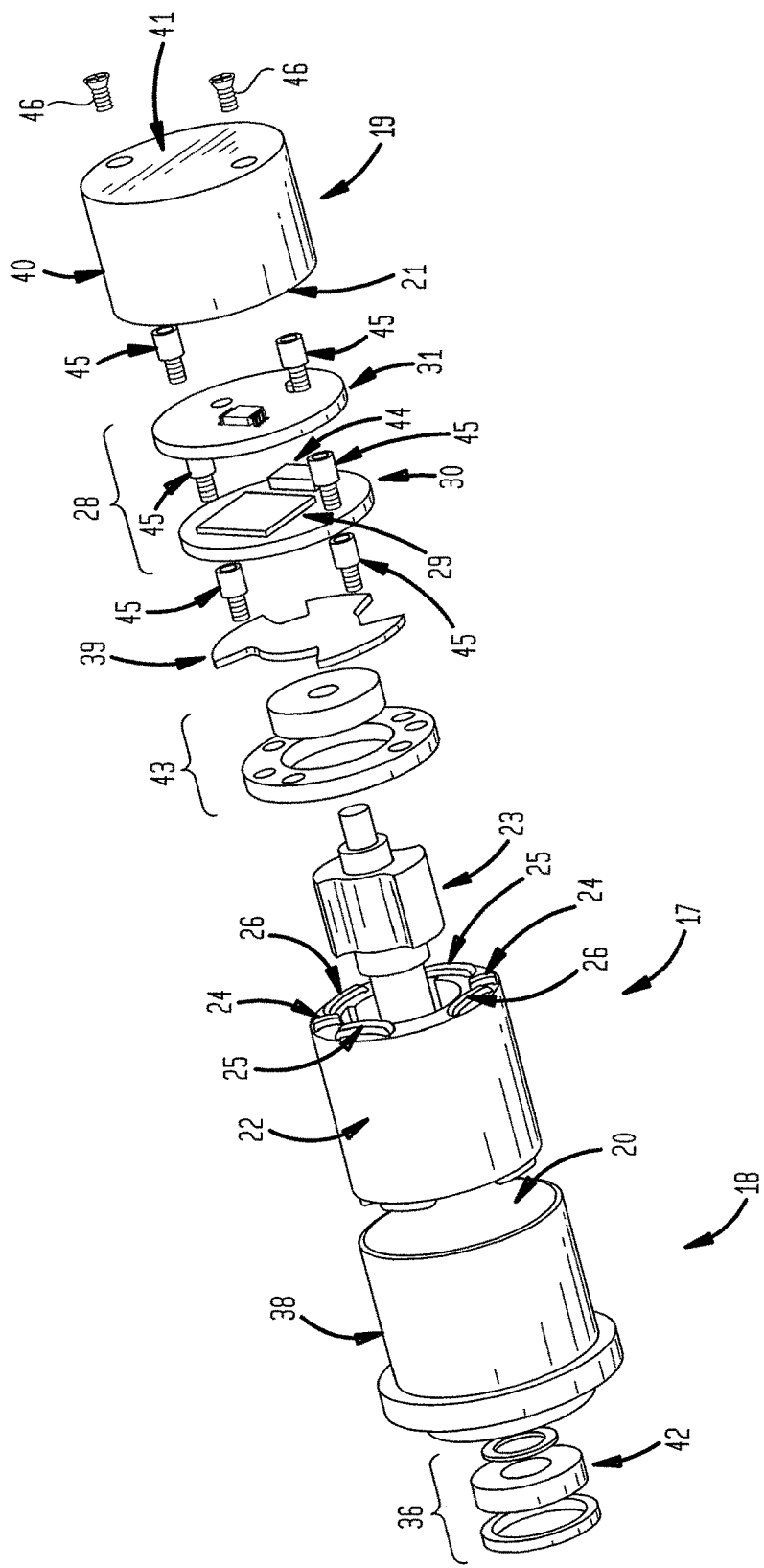
FIG. 3 is an exploded view of the position sensor assembly shown in FIG. 1.
Figure 4:
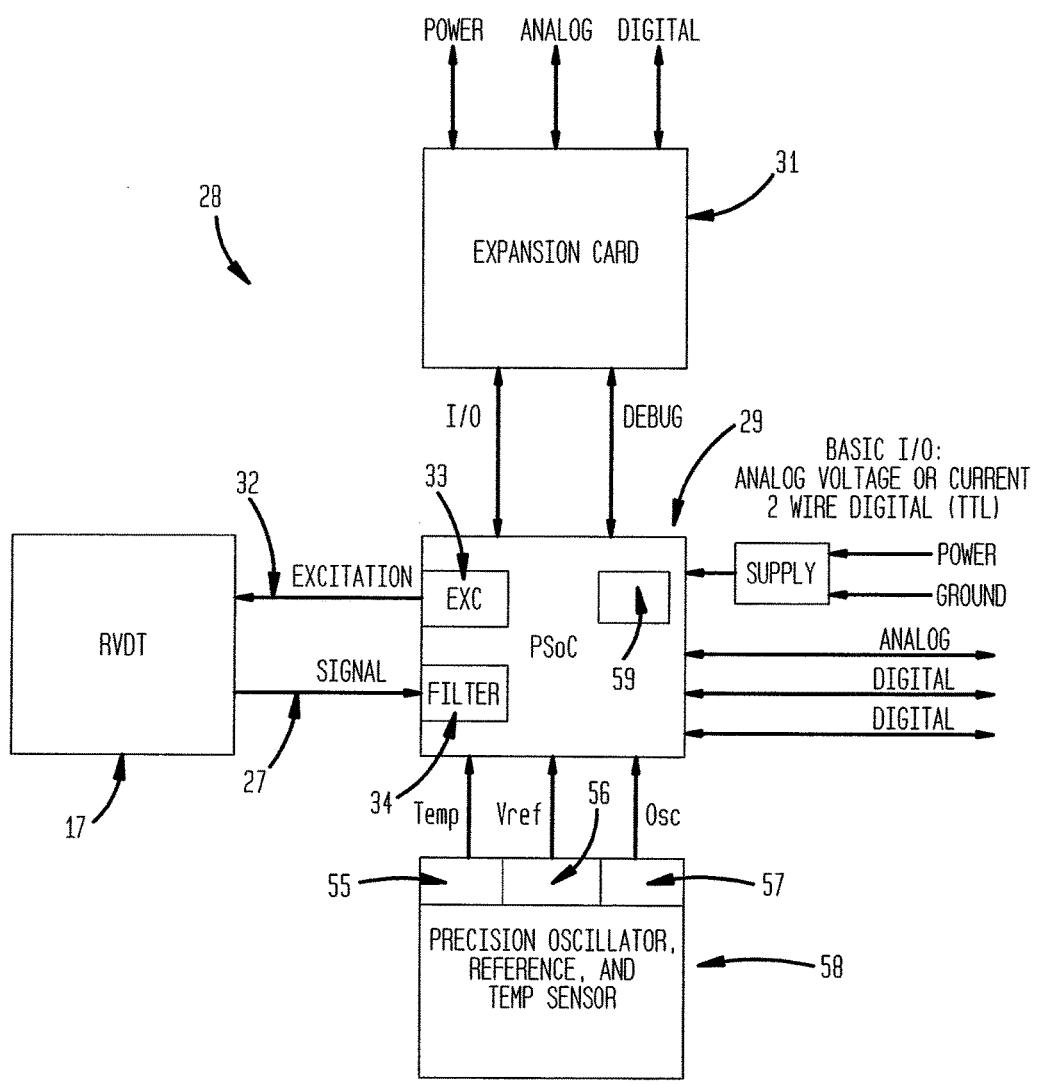
FIG. 4 is a schematic view of the integrated signal conditioning electronics of the position sensor assembly shown in FIG. 1.

As shown in FIGS. 3 and 4, integrated electronics 28 generally includes circuit board 30 and mezzanine or expansion board 31. Circuit board 30 includes microcontroller integrated circuit 29, having configurable blocks 33 and 34 that excite 32 primary windings 24 and filter signal 27 from secondary windings 25 and 26, and interface 44. Integrated circuit 29 controls the frequency and amplitude of excitation signal 32, demodulates signal 27 from the secondary windings, filters to eliminate the carrier frequency, samples and converts 82 the received analog signal 27 into digital format, and calibrates 110, 120, compensates 83, 84, amplifies, scales and buffers the signal for output 85. Mezzanine board 31 is provided to allow for custom interfaces, such as a digital interface for a standard digital bus. As shown, circuit board 30 includes additional chip set 58, which in this embodiment includes temperature sensor 55, voltage reference chip 56 and oscillator 57, with outputs to integrated circuit 29.

Figure 2:
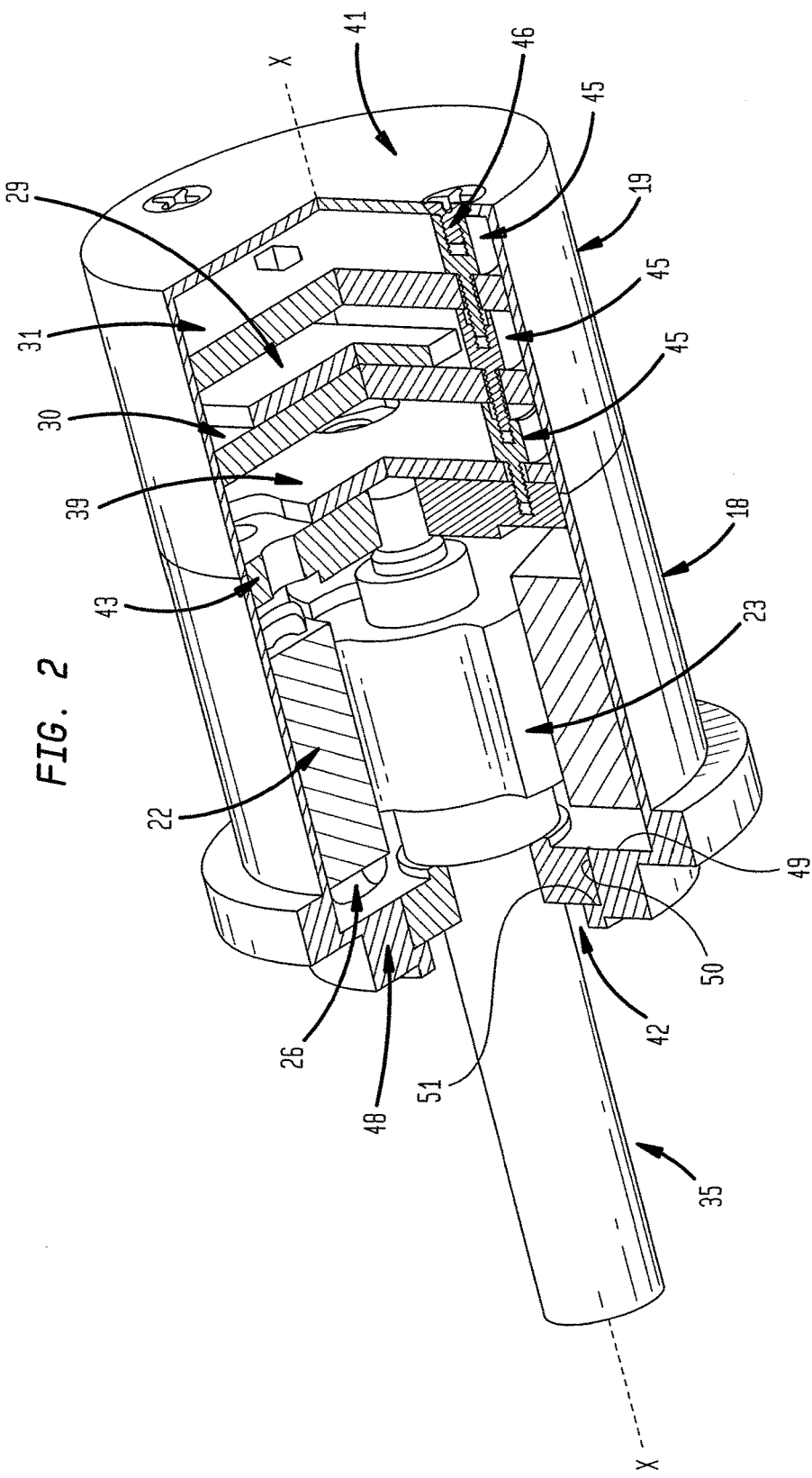
FIG. 2 is a cross-sectional view of the position sensor assembly shown in FIG. 1.

As shown in FIGS. 1-3, electronics 28 are fully integrated with RVDT 17 in housing 16 such that RVDT 17 and signal conditioning electronics 28 are fully contained and enclosed within the interior cavities of unitary housing 16. In this embodiment, housing 16 generally comprises sensor housing subassembly 18 having cavity 20, and electronics housing subassembly 19 having cavity 21. Sensor housing subassembly 18 is formed by annular bearing end portion 36, hollow cylindrical body portion 38 and circular intermediate end plate 39. The left end of cylindrical portion 38 includes inwardly extending double seat 48, defined by rightwardly-facing annular surface 49, inwardly-facing cylindrical surface 50, and rightwardly-facing annular surface 51. The left ends of coils 24, 25 and 26 abut against and are axially restrained by surface 49 and the left annular face of bearing 42 abuts against and is axially restrained by surface 51.

Annular bearings 42 and 43, positioned axially along axis x-x on the left and right outer sides, respectively, of cavity 20, support rotor 23 within cavity 20 of housing subassembly 18 so as to allow rotor 23 to rotate about axis x-x relative to housing 16. Coil assembly 22 is positioned axially interior to bearings 42 and 43, respectively, within cavity 20. Coil 24 is positioned circumferentially between coils 25 and 26. Thus, bearing 42, coil assembly 22 and bearing 43 are stacked axially within housing subassembly 18, with end plate 39 separating cavity 20 from cavity 21 of electronics housing subassembly 19.

Electronic housing subassembly 19 generally comprises hollow cylindrical body 40 having circular end plate 41 and forming inner cylindrical cavity 21. Integrated electronics 28 are stacked axially along axis x-x within cavity 21 of subassembly housing 19. In particular, circuit board 30 is positioned axially to the right of intermediate housing plate 39 and mezzanine board 31 is positioned axially to the right of board 30. As shown, each of coils 24-26, bearing 43, intermediate housing plate 39, board 30 and mezzanine board 31 has an outer diameter slightly less than the inner diameter of cylindrical housing portions 38 and 40 so as to allow for the axial stacking transversely along axis x-x described above.

Mechanical threaded stand-off spacers, severally indicated at 45, provide proper axial spacing of transversely extending boards 30 and 31 in cavity 21 between intermediate housing plate 39 and housing end plate 41. Electronics subassembly 19 is connected to sensor subassembly 18 by spacers 45, attached to each other by threaded connections, and machine screws 46 extending through end portion 41 and attached to respective spacers 45 by threaded connections. Thus, housing 16 contains both RVDT 17 and electronics 28 in a fully integrated package.

Microcontroller integrated circuit 29 is configured to provide initial calibration for inherent non-linearity in the stator 22, rotor 23 and their mechanical assembly, as well as for thermal non-linearity, of each assembly 15 and to provide operational compensation 80 for such linearity and temperature variations. Thus, compensation routine 80 is directed to producing a linear output signal 85 and is described with reference to FIGS. 8-14. At step 81 of FIG. 8, signal 27 is received 81 as an output from RVDT 17 in the form of an AC signal (sine wave) of varying amplitude and phase with respect to excitation signal 32. Output signal 27 is then converted from analog to digital at step 82. With respect to the conversion of step 82, the voltage reference from voltage chip 56 is used to provide an accurate and stable voltage reference in the conversion and the signal from oscillator 57 is applied to provide more accurate timing during sampling. Sampling can be synchronous with demodulation occurring in the analog domain, or sampling can be asynchronous with demodulation occurring in the digital or software domain. The ability of integrated circuit 29 to handle both synchronous and asynchronous sampling provides flexibility regarding execution of the signal acquisition and processing techniques described herein, and further allows for the implementation of all described position sensor assembly 15 embodiments. After demodulation at step 82, the signal is compensated for linearity at step 83 and temperature at step 84.

A method of linear compensation 83 is further shown and described with reference to FIG. 9. Initially, the system acquires a measured position 91 from the raw position value output from the demodulation and analog to digital conversion at step 82. From here, the system may perform either of error correction or error lookup at step 92. Error correction, or polynomial correction, maps the error as a function of a measured position of rotor 23. Constants are generated, which provide a polynomial fit to the measured error. The generated polynomial can be used to compensate for any error that is present in the measured position. The generated polynomial will take the form:

$$\text{Error} = a_n X^n + a_{n-1} X^{n-1} + \ldots + a_2 X^2 + a_1 X + a_0$$

wherein X represents measured position, and wherein the constants $a_n \ldots a_0$ are calculated at linear calibration 110, which is discussed below in greater detail with reference to FIG. 11.

Polynomial correction requires less memory than error lookup, but may not be able to compensate all situations. Conversely, utilizing error lookup at step 92 may require more memory than error correction, but error lookup can compensate all situations. Like polynomial error correction, error lookup also maps the error as a function of measured rotor position. However, the measured error is stored directly into a table and is directly looked up at run time. According to one embodiment of the disclosure, a table may be generated which holds all possible position values and all position errors at those values. According to another embodiment, a table may be generated which holds only a portion of the possible position values and position errors, and then linear interpolation or similar techniques may be used to fill in any gaps in the acquired data. In the case of utilizing error lookup at step 92, the necessary equation will take the form of:

$$\text{Error} = \text{errorValues}[X]$$

wherein X represents the measured position.

After performing either error correction or error lookup at step 92, linear compensation method 83 then performs error subtraction at step 93, wherein a linearized (compensated) position 94 is calculated as being equal to the measured position 91 minus the error (taken from step 92). In one embodiment, the linear compensation steps of FIG. 9 may be performed at a production factory, resulting in a position sensor assembly that will be able to be continuously corrected for linear compensation during operation using the factory corrected values. The linearized (compensated) position 94 is a position that has been fully compensated for linear errors in the assembly 15. However, errors due to temperature may still be present.

Accordingly, position sensor method 80 of FIG. 8 proceeds to temperature compensation method 84, which is herein described in detail with reference to FIG. 10. Initially, linearized position 94 is calculated with respect to the procedure illustrated in FIG. 9 and disclosed hereinabove. At step 101, temperature of the position sensor assembly is measured. Preferably, the temperature is measured by discrete temperature sensor 55 on main processor board 30 of position sensor assembly 15. In an additional embodiment of the disclosure, temperature is alternatively measured by means of a thermistor embedded within stator 22, or by any other thermal transducer or sensor disposed at any other location within housing 16.

After receiving linearized position 94 and a measured temperature (from step 101), temperature compensation method 84 proceeds to step 102, wherein either polynomial error correction or error lookup is performed. The procedure of step 102 is substantially the same as the error correction/lookup step 92 described with reference to FIG. 9 hereinabove, however constants $a_n \ldots a_0$ (if using error correction) and/or position errors (if using error lookup) used in the corresponding error calculations will have been determined during temperature calibration 120 (as opposed to during linear calibration), discussed below in more detail with reference to FIG. 12.

Temperature compensation method 84 next proceeds to step 103, wherein a temperature compensated position 104 is calculated by subtracting the error calculated in step 102 from linearized position 94. In one embodiment, the temperature compensation steps of FIG. 10 may be performed at a production factory, resulting in a position sensor assembly that will be able to be continuously corrected for temperature compensation during operation using the factory corrected values. The resulting compensated position 104 is a position that has now been fully compensated for both linearity errors in the sensor in addition to errors resulting from fluctuations in the sensor temperature.

Referring back to FIG. 8, compensated position 104 is now stored within memory 59 of microcontroller integrated circuit 29 as compensated output 85. In a preferred embodiment, integrated circuit 29 comprises an internal digital register 59 to store the compensated output 85, which may then be presented to a user via mezzanine board 31 as an analog or digital signal via RS-232, RS-48, CAN, USB, SPI, I2C, or any other means of signal delivery as known in the art.

Figure 11:
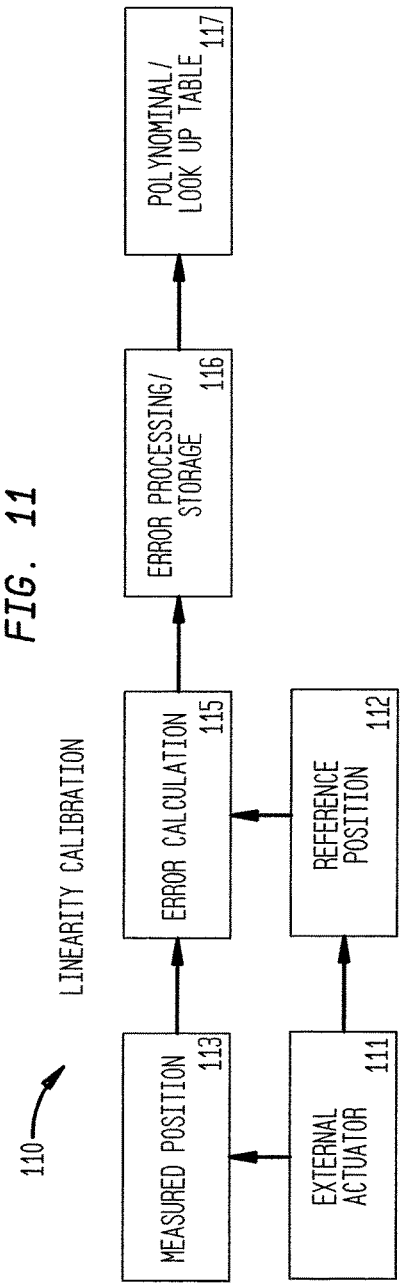
FIG. 11 is a block diagram of the initial linearity calibration for the linearity compensation shown in FIG. 9.

Turning to FIG. 11, a process of linearity calibration 110 is disclosed. Position sensor assembly 15 is driven by an external actuator 111 through its entire position range while the temperature is held constant at a preferred 25 degrees Celsius, though any other suitable temperature may be used. An external reference position 112 for rotor 23 is provided to the system, preferably taken from a previously calibrated high resolution reference. Next, the system determines a sensor measured position 113 and compares this position to the known good reference position 112 in order to calculate a detected error 115. The detected error 115 is then preferably processed and/or stored in memory 59 in step 116, wherein depending on the type of compensation method being used (error correction or error lookup), polynomial constant(s) will be either generated for immediate output or stored in memory 59 in a lookup table for future use at step 117.

Figure 12:
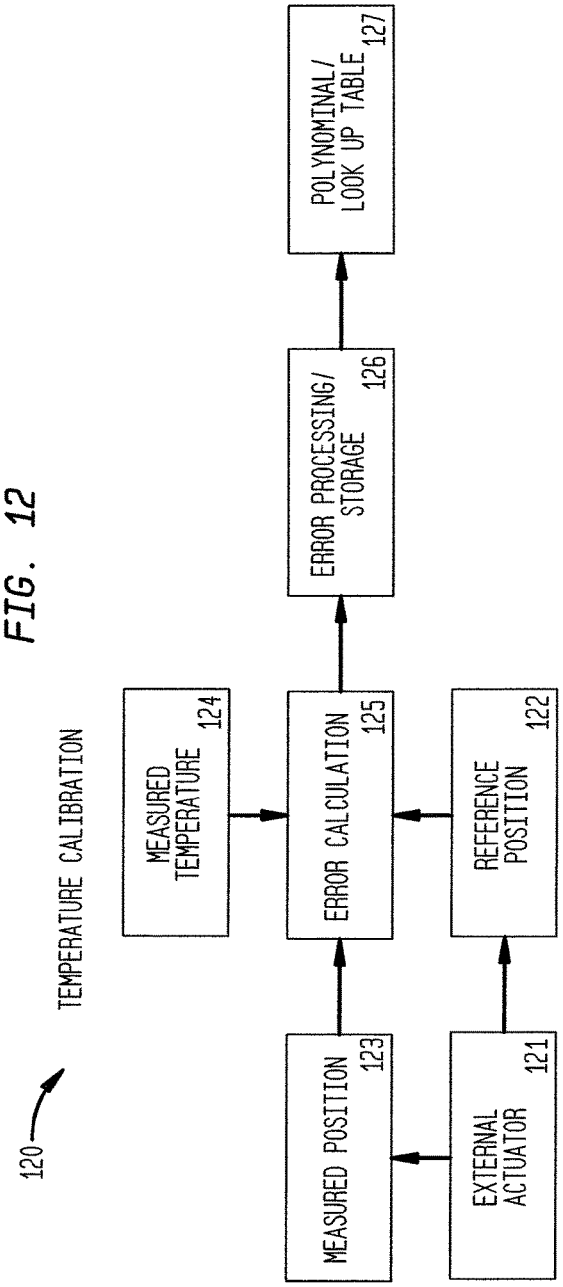
FIG. 12 is a block diagram of the initial temperature calibration for the temperature compensation shown in FIG. 10.

Temperature calibration process 120 is now disclosed with reference to FIG. 12. Position sensor assembly 15 is driven by an external actuator 121, wherein the sensor may be driven through its entire position range. Alternatively, the sensor may be held in a stable position. Position sensor assembly 15 is then subjected to external temperatures over its entire temperature range, while the system measures and records the sensor position 123 and temperature 124. The measured position 123 and measured temperature 124 of the sensor are then compared to a known good reference position at a preferred 25 degrees Celsius 122, in order to calculate a detected error 125. Similarly to the linearity calibration method 110, the detected error 115 of temperature calibration method 120 is then preferably processed and/or stored in memory 59 in step 126, wherein depending on the type of compensation method being used (error correction or error lookup), polynomial constant(s) will be either generated for immediate output or stored in memory 59 in a lookup table for future use at step 127.

Figure 13:
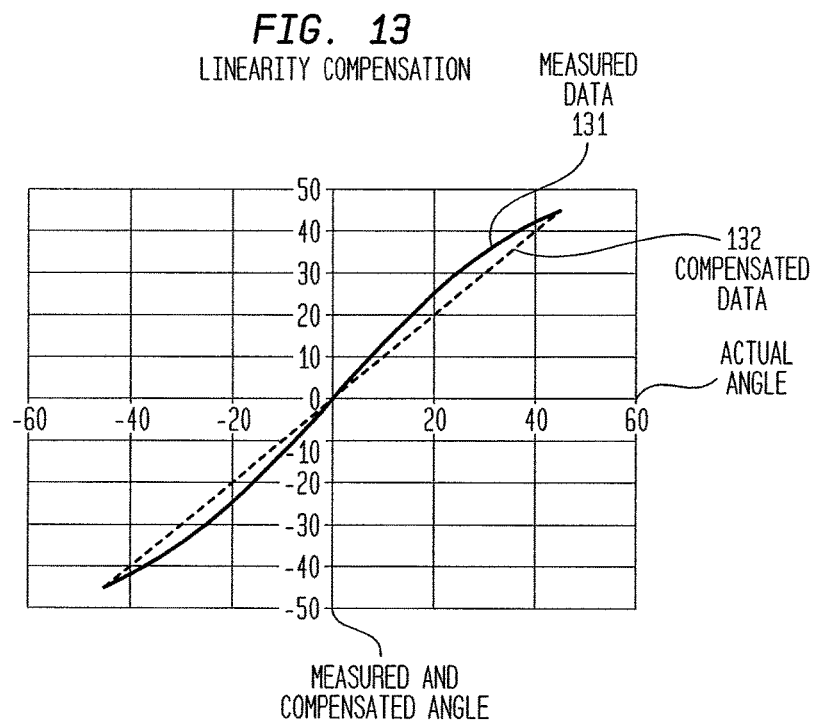
FIG. 13 is a plot of measured and compensated angle (ordinate) vs. actual angle (abscissa) showing linearity compensation.
Figure 14:
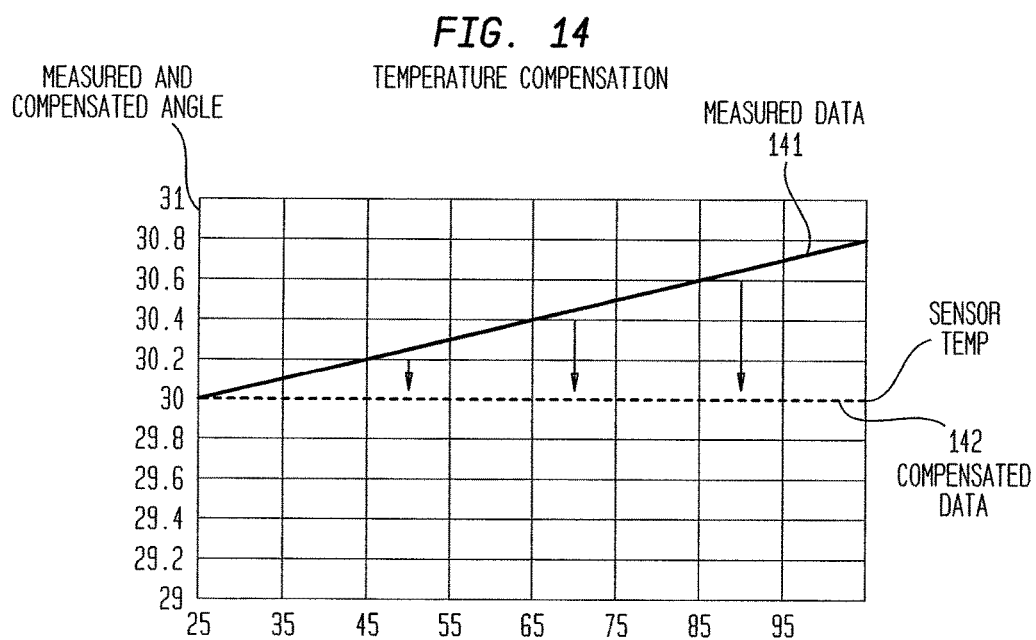
FIG. 14 is a plot of measured and compensated angle (ordinate) vs. sensor temperature (abscissa) showing temperature compensation.

FIG. 13 is a plot of measured and compensated angle (ordinate) vs. actual angle (abscissa) showing linearity compensation at a preferred constant temperature of 25 degrees Celsius. Solid line 131 illustrates an embodiment of measured positions of the sensor, while the dotted line 132 illustrates the preferred positions compensated for linearity. FIG. 14 is a plot of measured and compensated angle (ordinate) vs. sensor temperature angle (abscissa) showing temperature compensation at a preferred constant rotor angle of 30 degrees. Solid line 141 illustrates an embodiment of measured positions of the sensor, while the dotted line 142 illustrates the preferred positions compensated for temperature.

The integration of the electronics and the use of a digital interface provides for improved noise immunity, reduces system weight and cost and provides ease of integration. The use of a digital bus interface also allows for a chaining of multiple devices. The output of assembly 15 can provide both position and rate information. Assembly 15 thereby simplifies the integration of an AC RVDT position transducer device by integrating the necessary conversion and conditioning electronics 28 in the body or housing 16 of the device. Integrated electronics 28 provide the excitation to the primary windings, demodulation of the secondary windings, conversion of the demodulated AC signal to a DC signal, provide amplification of the DC signal, provides for hardware/software signal filtering, and compensates for non-linearity in the signal from the RVDT. The output signal of assembly 15 can be DC voltage or current or any standard digital bus signal. For fly-by-light applications, assembly 15 can also integrate a fiber optic front end.

While a RVDT sensor is shown and described in this embodiment, it is contemplated that other high reliability rotary or linear transducer types can be employed, including but not limited to resolvers, synchros, and linear variable differential transformers (LVDTs). In an LVDT embodiment, coils 25 and 26 may be oriented annularly about axis x-x and coil 24 may be positioned axially between coils 25 and 26 such that bearing 42, coil 25, coil 24, coil 26 and bearing 43 are stacked axially within housing subassembly 18, with end plate 39 separating cavity 20 from cavity 21 of electronics housing subassembly 19.

Figure 5:
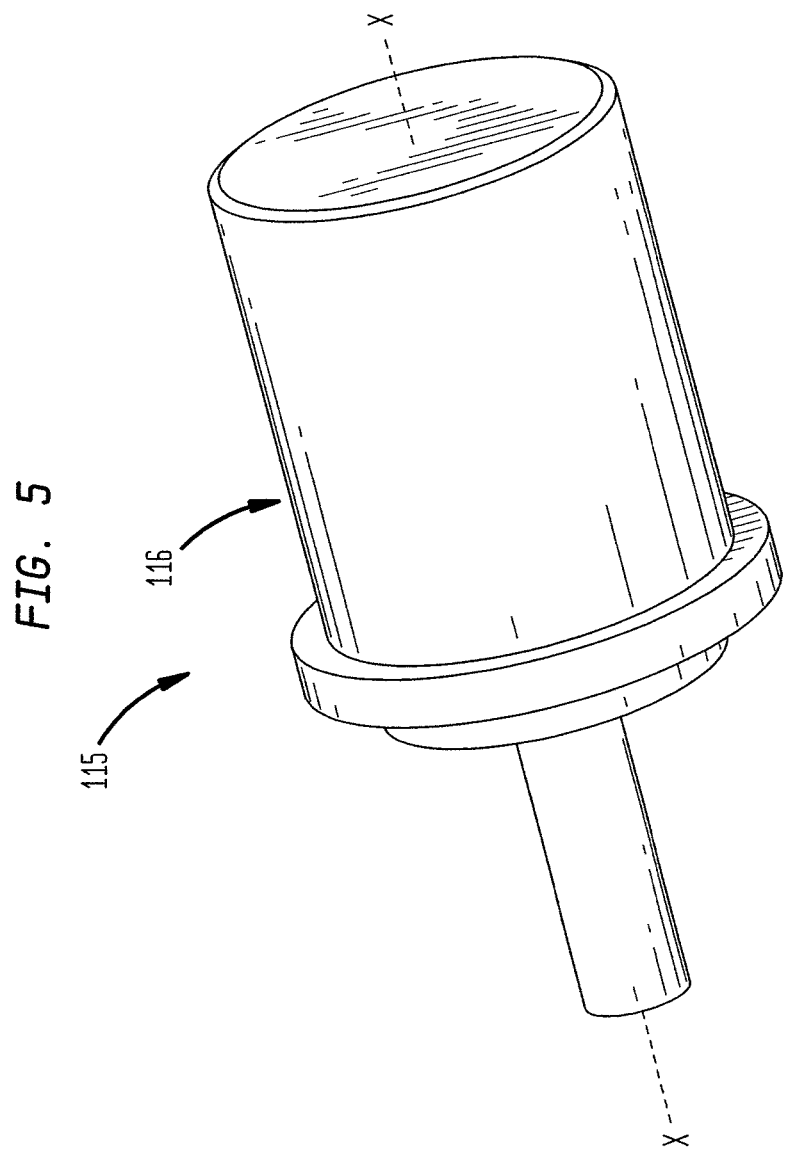
FIG. 5 is a perspective view of a second embodiment of an improved position sensor assembly.
Figure 6:
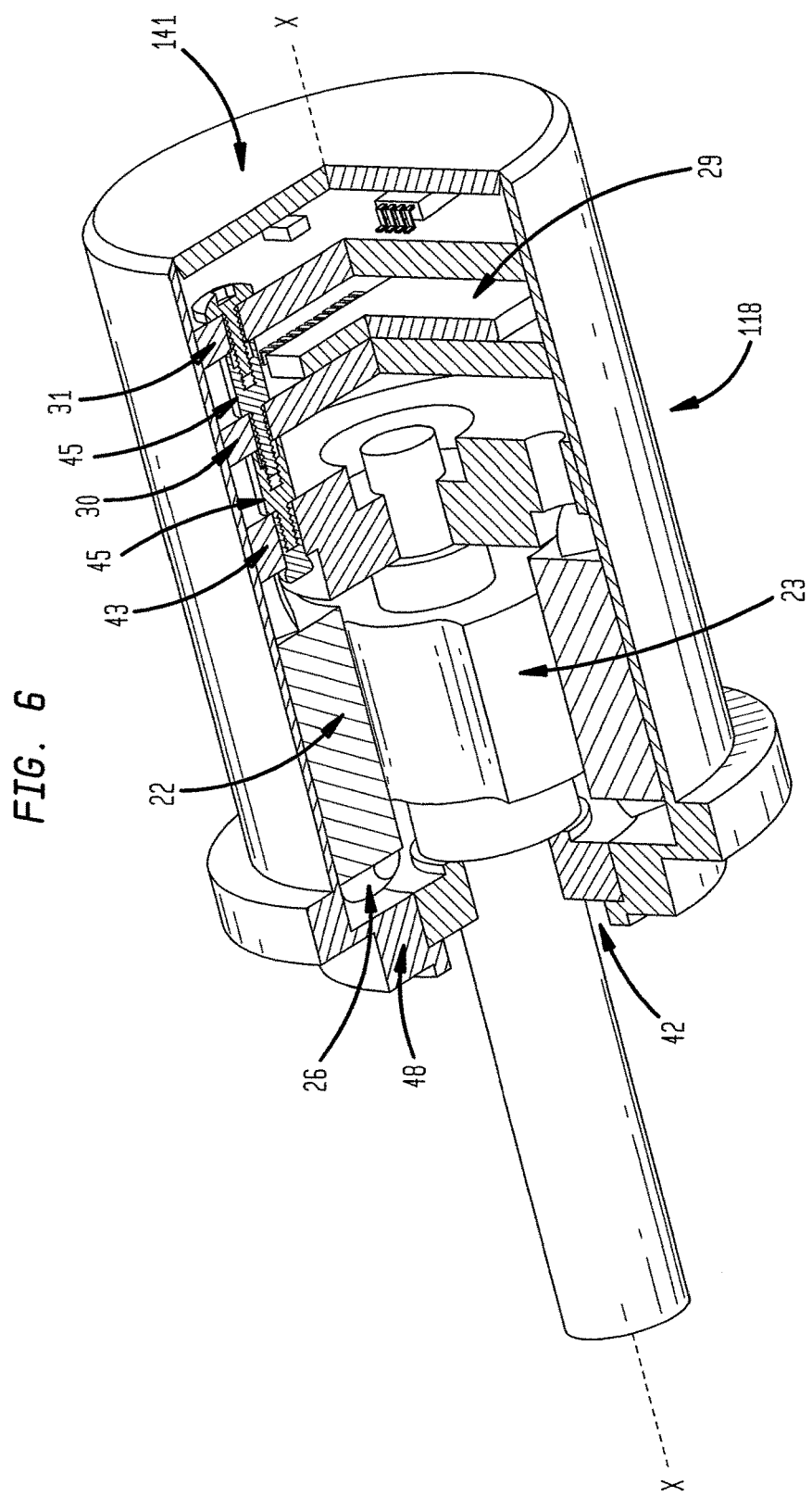
FIG. 6 is a cross-sectional view of the position sensor assembly shown in FIG. 5.
Figure 7:
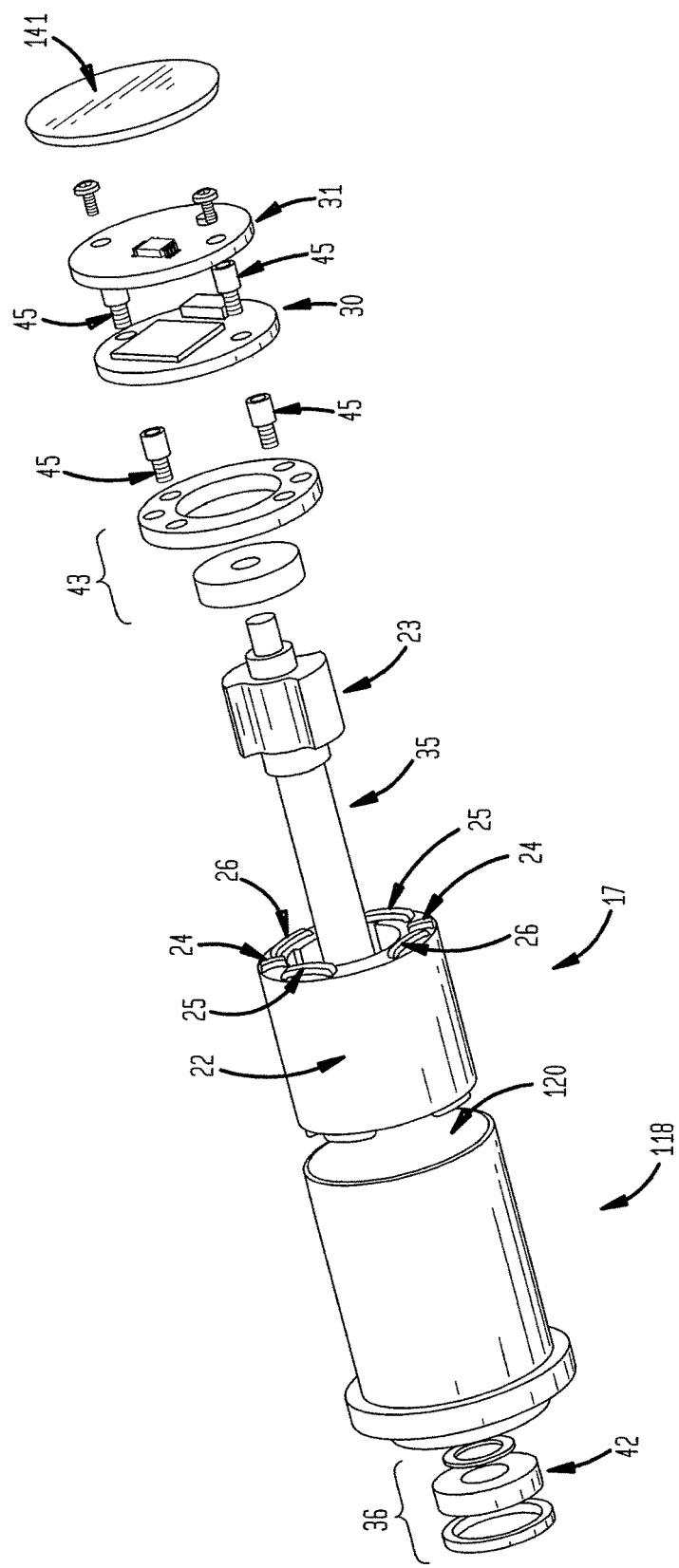
FIG. 7 is an exploded view of the position sensor assembly shown in FIG. 5.

A second embodiment 115 is shown in FIGS. 5-7. This embodiment is generally the same as assembly 15 but differs in that housing 116 is not formed from two connected subassemblies and does not include intermediate housing portion 39, as in assembly 15. Rather, housing 116 is formed from a longer cylindrical body portion 118 and a circular end plate 141 fixed to the annular right end of cylinder 118 and has a unitary inner cavity 120.

While the presently preferred form of the improved position sensor assembly has been shown and described, and several modification thereof discussed, persons skilled in this art will readily appreciate the various additional changes and modifications may be made without departing from the scope of the invention, as defined and differentiated by the following claims.

What is claimed is:

1. A position sensor assembly comprising:
   a housing having at least one inner cavity;
   a stator disposed within said housing;
   a moving element disposed within said housing and configured and arranged to move relative to said stator;
   said stator comprising primary windings and secondary windings, said secondary windings configured and arranged to provide an output signal as a function of movement of said moving element relative to said stator;
   signal conditioning electronics disposed in said housing and communicating with said primary windings and said secondary windings;
   said signal conditioning electronics comprising an integrated circuit configured and arranged to provide excitation of said primary winding and to demodulate said output signal of said secondary windings;
   moving element positional calibration data;
   said integrated circuit configured and arranged to provide a moving element position output compensated as a function of said moving element positional calibration data; and
   an input element extending through said housing and connected to said moving element.

2. The assembly set forth in claim 1, wherein:
   said housing comprises a sensor housing subassembly having a first inner cavity and an electronics housing subassembly having a second inner cavity;
   said stator and said moving element are disposed within said first inner cavity of said sensor housing subassembly; and
   said signal conditioning electronics are disposed within said second inner cavity of said electronics housing subassembly.

3. The assembly set forth in claim 2, wherein said electronics housing subassembly is removably connected to said sensor housing subassembly.

4. The assembly set forth in claim 3, wherein said electronics housing subassembly is screwed to said sensor housing subassembly.

5. The assembly set forth in claim 2, wherein said sensor housing subassembly comprises a bearing end portion, a sensor body portion and an intermediate portion, and said electronics housing subassembly comprises an electronics body portion and a second end portion.

6. The assembly set forth in claim 2, wherein said sensor housing subassembly comprises a signal output port.

7. The assembly set forth in claim 1, wherein said moving element is configured and arranged to move linearly along a central axis relative to said stator or said moving element is configured and arranged to rotate about a central axis relative to said stator.

8. The assembly set forth in claim 1, wherein said moving element comprises a magnet.

9. The assembly set forth in claim 1, wherein said stator and said moving element comprise a rotary variable differential transformer.

10. The assembly set forth in claim 1, wherein said moving element and said stator comprise a resolver.

11. The assembly set forth in claim 1, wherein said signal conditioning electronics comprise a converter configured and arranged to convert said output signal to a digital signal.

12. The assembly set forth in claim 1, wherein said conditioning electronics comprise a signal filter configured and arranged to filter out a carrier frequency and/or an amplifier.

13. The assembly set forth in claim 1, wherein said conditioning electronics comprise a DC signal buffer.

14. The assembly set forth in claim 1, wherein said assembly comprises a temperature sensor configured and arranged to provide a temperature signal to said integrated circuit and said integrated circuit is configured and arranged to provide said moving element position output compensated as a function of said temperature signal.

15. The assembly set forth in claim 14, wherein said integrated circuit is configured and arranged to provide said moving element position output compensated as a function of said moving element calibration data and said temperature signal.

16. The assembly set forth in claim 15, wherein said temperature sensor is on said integrated circuit or in said stator.

17. A method of calibrating a position sensor assembly, comprising the steps of:
   providing a position sensor assembly having a housing with at least one inner cavity, a stator disposed within said housing, a moving element disposed within said housing and configured and arranged to move relative to said stator, an input element extending through said housing and connected to said moving element, said stator comprising primary windings and secondary windings, said secondary windings configured and arranged to provide an output signal as a function of movement of said moving element relative to said stator;
   providing signal conditioning electronics in said housing having a memory and an integrated circuit communicating with said primary windings and said secondary windings and configured and arranged to provide excitation of said primary winding and to condition said output signal of said secondary windings;
   providing a temperature sensor in said housing;
   mounting said position sensor assembly on an external actuator, wherein said external actuator is configured and arranged to drive said moving element of said position sensor assembly through a range of reference positions;
   operating said external actuator through said range of reference positions;
   calculating a position error as a function of said output signal of said secondary windings and said reference position;
   sensing a measured temperature with said temperature sensor;
   calculating a temperature error as a function of said output signal of said secondary windings, said measured temperature, and a temperature reference;
   storing said position error and said temperature error in said memory to provide moving element calibration data; and
   said integrated circuit configured and arranged to provide a moving element position output compensated as a function of said moving element calibration data.

18. A method of compensating a position sensor assembly, comprising the steps of:
   providing a position sensor assembly having a housing with at least one inner cavity, a stator disposed within said housing, a moving element disposed within said housing and configured and arranged to move relative to said stator, an input element extending through said housing and connected to said moving element, said stator comprising primary windings and secondary windings, said secondary windings configured and arranged to provide an output signal as a function of movement of said moving element relative to said stator;

providing signal conditioning electronics in said housing having a memory and an integrated circuit communicating with said primary windings and said secondary windings and configured and arranged to provide excitation of said primary winding and to condition said output signal of said secondary windings;

providing a positional calibration dataset;

providing a temperature calibration dataset;

providing a temperature sensor in said housing;

connecting said moving element to an external actuator;

operating said external actuator;

taking temperature measurements with said temperature sensor;

providing a mover position output compensated as a function of said output signal of said secondary windings, said temperature measurements, said positional calibration dataset and said temperature calibration dataset.

* * * * *